Figure 1:
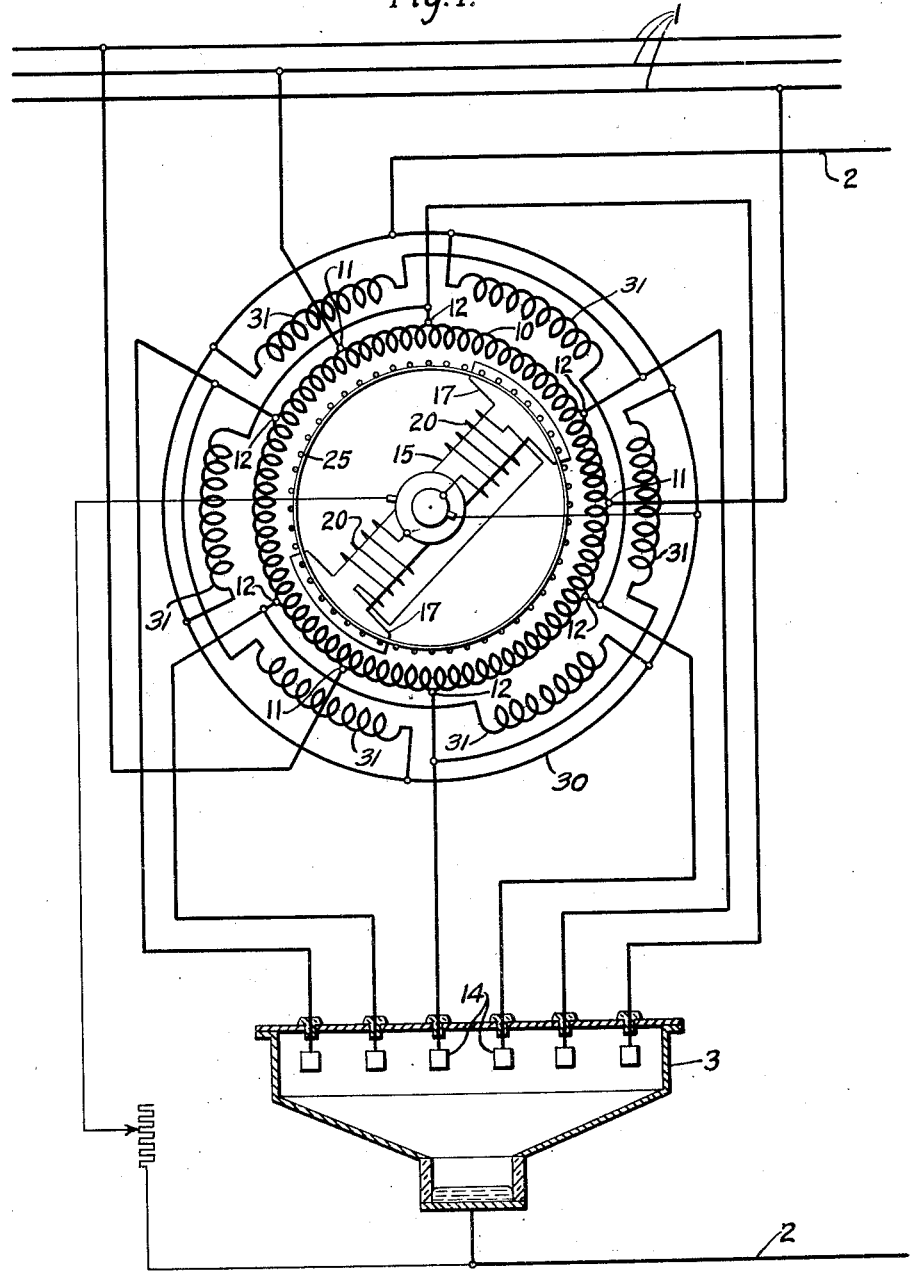

June 25, 1935.    J. SLEPIAN ET AL    2,005,876
ELECTRICAL CONVERSION SYSTEM
Filed May 19, 1934    2 Sheets-Sheet 2
Fig. 2.
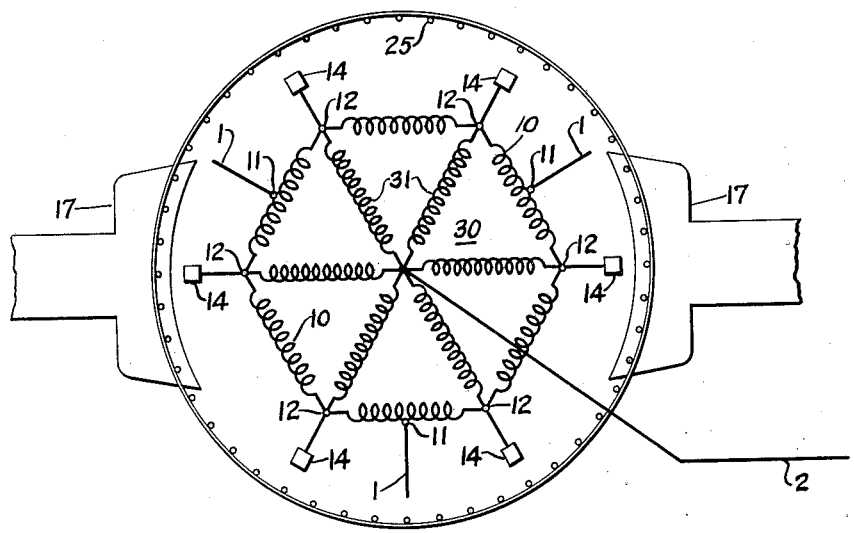
WITNESSES:
INVENTORS
Joseph Slepian, Leon R. Ludwig &
Daniel Silverman.
BY
ATTORNEY Patented June 25, 1935

2,005,876

UNITED STATES PATENT OFFICE 2,005,876

ELECTRICAL CONVERSION SYSTEM

Joseph Slepian, Pittsburgh, and Leon R. Ludwig and Daniel Silverman, Wilkinsburg, Pa., assignors to Westinghouse Electric & Manufacturing Company, East Pittsburgh, Pa., a corporation of Pennsylvania Application May 19, 1934, Serial No. 726,582

14 Claims. (Cl. 175—363)

Our invention relates to an electrical conversion system and particularly to a filtering system for a vapor electric converter.

An ideal conversion system for transferring electrical energy between alternating and direct-current systems would draw from or deliver to the alternating current system only sine wave currents of normal frequency and supply to or withdraw from the direct-current system only continuous currents free from any harmonics.

Conversion equipment as heretofore installed meets this requirement only to a very limited degree without becoming excessively expensive. The current harmonics drawn by present conversion equipment circulate in the alternating-current and direct-current circuits and reduce the capacity of connected generators, motors, etc.

Until the present time, little attention has been directed to the elimination of these harmonics on the alternating current side, because the present conversion systems are as a rule only a small part of the total load capacity of the systems to which they are connected, so that the reduction in capacity of the system because of the circulating harmonics is not sufficiently large to cause serious difficulty. However, as the conversion equipment becomes a larger proportion of the total system load, the harmonics become increasingly important.

It has been suggested that power be generated as alternating current and transmitted as direct current. In this event, it will be necessary either to remove the harmonics caused by the conversion equipment or suffer a corresponding reduction in the total capacity of the generating equipment. It seems likely it would be better to pay the toll required by these harmonics by using equipment specifically designed for eliminating them in connection with the rectifier or inverter tubes than to try to incorporate this function in the generators or power consuming equipment.

We may learn much at this point by examining the rotary converter, which nearly meets the requirements for an ideal rectifying system enunciated above. The rotary converter differs from other rectifying systems in that it has incorporated within itself in addition to the elements which effect the actual rectification, (that is, the commutator bars and brushes) a winding on a rotor, and an associated field structure having on it series and parallel direct current windings, and also a damper winding which may carry higher frequency currents. What is the function of this dynamo-electric machine which is interposed between the slip rings (alternating current side) and the commutator bars (rectifying elements) in the rotary converter? It does not supply torque. Neither does it need to supply or withdraw reactive power from the alternating current system. Yet it must supply some necessary purpose, since its kva. capacity is considerable, so that the incentive to dispense with it if it were possible must have always been very great.

Two aspects of the desirable function which the rotary armature fulfills may be seen by considering voltage conditions and current conditions.

The potential of any one tap (slip ring), coincides with that of any one brush only at one instant in a cycle. At that instant there is a direct electrical connection between the slip ring and brush. At any other instant, the path from the slip ring to the brush is through a varying length of the armature winding. At the same time, the voltage of the slip ring differs from that of the brush. The armature winding then takes up this difference of voltage, thus obviating the requirement that the slip ring shall be in direct metallic connection with the brush. If the potential of the ring needed to be the same as that of the brush for any length of time, then there would need to be harmonics in the potential of the ring or harmonics in the potential of the brush, or both. We see, then, how the armature eliminates harmonics in the alternating current and direct current potentials. The field structure and damper winding also plays a part in this, since they, with the rotation, ensure a sinusoidal voltage distribution around the armature.

Turning now to the current aspect, we see at once that the function of the armature is to take up the difference between currents drawn by the brushes, and the currents supplied by the slip rings. These currents, as is well known, compensate each other in large degree in the armature, but not completely. If the compensation were complete, no armature winding would be necessary. The difference between the brush currents in the armature and the slip ring currents in the armature, consists of harmonic, higher frequency currents in the coils, and also normal frequency currents distributed in not the normal phase sequence. We see then how the armature eliminates harmonics in the slip ring and brush currents. The field structure and damper winding also play a part in this, since the damper and interpolar spaces almost completely reduce the magnetic fluxes which would be produced by the harmonic currents, and which would prevent the free flow of these currents and cause harmonics in the voltage.

The dynamo-electric part of a rotary then takes up or consumes the harmonic voltages and currents which must arise in transferring power so far as possible conductively from undistorted six-phase alternating current to direct current. Since both voltage and current must be handled by it, it must have a definite kva. capacity. For a six-phase rotary the dynamo kva. capacity is 52% of the direct current output, and for an infinitely many phase rotary the dynamo kva. capacity is 43% of the direct current output.

When other rectifier arrangements are considered, it is quite clear that if harmonic free alternating current and direct current are to be obtained, apparatus must be used which will play the part of the armature of the rotary, that is absorb the necessary harmonics of voltage and current. Such apparatus is usually provided as a "filter". It also seems inevitable that the kva. capacity of this filter equipment will need to be at least as great as the kva. capacity of the dynamo part of the corresponding rotary converter, that is 52% of the direct current output for the six-phase case, and 43% for the infinitely many phase case.

Some of this kva. capacity is usually put into the rectifier transformer, which has a larger kva. capacity for ordinary service than for the rectifier service. The rest should be in the "filter". Where the filter does not have these dimensions, then there is necessarily a corresponding amount of harmonic kva. supplied to the alternating current or direct current system with reduction in capacity of these systems depending on their size.

The magnitude of the kva. of the required "filter" equipment is so great as to suggest that it will generally be most economical to construct it in the form of rotating dynamo machinery rather than by networks of reactors and condensers as is usually done. Also, the excellent performance of the dynamo part of the rotary in absorbing the harmonics suggest that there are particular advantages which rotating machines possess, over static apparatus for this purpose.

When electric valves are used to transfer energy between circuits it is not practical to use more than a limited number of valves, but to secure a substantially ripple-free current output it is desirable to utilize a very large number of valves. According to our invention an auxiliary filter winding is provided for eliminating the ripple from the circuit. This choke or filter winding is preferably constructed as an auxiliary winding closely coupled with the main winding of the rotating machine which then provides a low impedance path for the circulation of the harmonic constituting the ripple voltage.

It is an object of our invention, therefore, to provide a rotating machine for generating or absorbing the harmonics necessary in converting alternating current to direct current, or vice versa, by a vapor electric converter.

According to our invention, this filter system comprises an armature winding to which is connected the alternating current system and the valves of the vapor electric device.

The armature is provided with a suitable closed winding and associated with a field structure which produces substantially sinusoidal distribution of voltage in the armature winding. A star winding is also placed on the armature to provide an accessible neutral point for one terminal of the direct current. Due to its relation to the amortisseur winding, the magnetic effect of the harmonic currents in it are compensated, so that no harmonic currents need to be drawn from the supply terminals on its account.

Associated with the windings is a suitable amortisseur winding for providing a low impedance path for the higher harmonics generated by the converter.

It is a further object of our invention to provide a means for multiplying the phases between the alternating current circuit and the valves of the converter.

Other objects and advantages of our invention will be apparent from the following detailed description taken in conjunction with the accompanying drawings, in which Figure 1 is a schematic illustration of the conversion system embodying our invention, and Fig. 2 is a diagrammatic illustration of the connections according to our invention.

The system according to our invention comprises an alternating current circuit 1 and a direct current circuit 2 with a vapor electric converter illustrated as a multiple valve converter 3 for transferring energy between the alternating and direct current circuits.

Intermediate between the alternating current circuit 1, the direct current circuit 2 and the multivalve converter is a combined phase splitter and filter machine. This machine is of a rotating type having a continuous armature winding 10 disposed in the slots of a suitable armature core (not shown). This armature winding 10 is provided with equally spaced taps 11 for connection to the alternating current line 1.

In the invention as illustrated the alternating current line is three-phase and the armature winding 10 is provided with three equally spaced taps 11 for connecting to the three wires of the three-phase system.

The armature winding 10 is also provided with six equally spaced taps 12 for connection to the six valves 14 of the vapor electric device 3. Associated with the armature 10 is a suitable field structure 15 having oppositely disposed poles 17. On the field structure 15 is a suitable direct-current winding 20. Also on the field winding is a suitable amortisseur winding shown as a squirrel cage short circuited winding 25. The field structure 15 rotates at substantially synchronous speed with the field set up in the armature by the currents from the three-phase line in the continuous armature winding 10.

The amortisseur winding 25 is coupled with the armature winding 10 and provides a low impedance path for the circulation of higher harmonics currents desirable in the operation of a vapor electric converter. Between the armature winding 10 and one side of the direct current circuit 2 is connected a star-connected winding 30. Preferably, this star-connected system has six phase windings 31 corresponding to the number of phases supplied to the converter 3.

This star winding 31 is preferably provided closely coupled with the armature winding 10 and is most conveniently located in the same slots as the armature winding 10. This close coupling between the star windings 31, the armature winding 10 and the amortisseur winding provides by transformer action a low impedance path for any harmonics present in the filter windings 31.

In the operation of our device as a rectifier current flows from the alternating current system 1 to the closed armature winding 10, which, in turn, acts as a phase splitter to provide six phase connection for the valves of the vapor electric converter 3. While any desired number of phases may be established by the phase splitting winding, we have illustrated our invention as having only six secondary phases. The current flows through the armature winding 10 to the valves of the converter, then from the cathode of the converter to the direct current bus 2.

The return connection to the direct current circuit 2 is made through the star-connected winding 31 which is closely coupled to the armature winding 10 and the amortisseur winding in such a manner so that the proper harmonic currents circulate in the ring winding and are not drawn from the alternating current supply source.

The exciting coil of the field structure is preferably connected across the direct current circuit 2. This field structure when operating at substantially synchronous speed insures a substantially sinusoidal distribution of the various potentials employed in the armature winding. The amortisseur winding provides a low impedance path for the higher harmonics desirable in the operation of the converter.

When the converter according to our invention is utilized for transferring energy from the direct-current circuit to the alternating-current circuit, the rotating field by producing a substantially sinusoidal distribution of voltage in the armature winding is instrumental in producing the desired commutation of the vapor electric converter.

Not only does the filter system secure proper commutation of the converter valves but by controlling the excitation, the wattless current necessary in the alternating current system may be supplied without drawing real power from the direct current system.

While we have shown and described a specific embodiment of our invention, it will be apparent that changes and modifications can be made therein without departing from the true spirit of our invention and by the scope of the appended claims.

We claim as our invention:

1. In an electrical conversion system having a vapor electric converter for transferring energy between alternating and direct current circuits, a dynamo-electric device comprising a closed armature winding, a series of taps in said winding for connection to an alternating current circuit, a second series of taps in said winding for connection to the valves of the converter, said second series of taps being a multiple of said first series of taps, a star-connected winding connected to the direct current circuit, said star-connected winding being closely coupled with said closed winding, a squirrel cage winding coupled with said closed winding said squirrel cage winding rotating at substantially synchronous speed with the fundamental field set up in the closed winding.

2. In an electrical conversion system having a vapor electric converter for transferring energy between alternating and direct current circuits, a control device comprising a closed armature winding, a series of taps in said winding for connection to an alternating current circuit, a second series of taps in said winding for connection to the valves of the converter, a star-connected winding, connected to the direct current circuit, said star-connected winding being closely coupled with said closed winding, a squirrel cage winding coupled with said closed winding said squirrel cage winding rotating at synchronous speed with the fundamental field set up in the closed winding and a direct current field rotating at synchronous speed with the field set up by said closed winding.

3. An electric conversion system for transferring energy between alternating and direct current circuits comprising a vapor electric converter, a winding for supplying current to said converter, a filter winding connected to the direct current circuit, said supply winding and said filter winding being closely coupled for providing a low impedance path for certain harmonics drawn by the converter and a short circuited winding associated with said supply winding for providing a low resistance path for the circulation of higher harmonics drawn by the converter.

4. In an electrical conversion system having an alternating current circuit, a direct current circuit and a vapor electric converter for transfering energy between the circuits, a dynamo-electric device comprising a continuous winding connected to the alternating current circuit and the anodes of the converter, a star-connected filter winding connected between the direct current circuit and the continuous winding, a direct current main field associated with both said windings said field being rotatively associated with said windings and an amortisseur winding rotatively associated with said windings.

5. A coupling device for a vapor electric converter comprising a dynamo-electric machine having field and armature members, a plurality of windings on said armature, one of said windings being closed, taps on said continuous windings for connection to an alternating current circuit and to the anodes of the converter, said second winding having a neutral point for connection to a direct current circuit and a return connection to the alternating current circuit, a direct current polarizing winding on the field member, and an amortisseur winding on the field member, said armature and field members being relatively rotative.

6. An electrical transformer and filter for a vapor-electric converter, comprising a closed armature winding, a plurality of taps in said winding for connection to an alternating current circuit, a plurality of taps in said winding for connection to the anodes of the converter, a second winding on said armature, said second winding being star-connected, the star point of said second winding being connected to a direct current circuit and the terminals to the first mentioned winding and a direct current field winding, said field and armature windings being relatively rotative.

7. An electrical transformer and filter for a vapor-electric converter, comprising a closed armature winding, a plurality of taps in said winding for connection to an alternating current circuit, a plurality of taps in said winding for connection to the anodes of the converter, a second winding on said armature, said second winding being star-connected, the star point of said second winding being connected to a direct current circuit and the terminals to the first mentioned winding and a direct current field winding, said field and armature being relatively rotative and means for varying the current in the direct current winding.

8. In an electrical conversion system, for supplying substantially pure wave forms having a three phase alternating current circuit, a direct current circuit, a six-phase vapor electric converter for transferring electrical energy between said circuits, a rotary transformer and filter comprising a continuous winding, three equal-spaced taps in said winding for connection to the alternating current circuit, six equal spaced taps in said winding for connection to the anodes of the converter, a six phase star-connected winding having the midpoint connected to the direct current circuit and having the terminals connected to the first mentioned winding at the points of attachment of the anode leads, the phase windings of said star winding being so disposed with respect to said first winding as to have a voltage displacement substantially intermediate that induced in the portions of the first mentioned winding adjacent to the anode connection, a core member associated with said windings, a winding connected across the direct current circuit, a core member polarized by said direct current winding, said core members being rotatively associated with each other and means for varying the current flow in said direct current winding.

9. An electrical conversion system comprising a polyphase alternating current circuit, a direct current circuit, a vapor-electric converter for transferring current between said lines, a closed polygonal winding connected to the alternating current circuit and to the anodes of the converter, a star connected winding connected to the point of connection of the anode of the converter and to the direct current circuit, said polygonal winding and said star winding having a common magnetic circuit, a direct current exciting winding associated with an auxiliary magnetic circuit, said magnetic circuits being movable relative to each other.

10. A harmonic eliminator and phase transformer for an electrical conversion system comprising an armature, a polarity of windings thereon, one of said windings being continuous, a plurality of taps in said continuous winding adapted for connection to an alternating current circuit, a plurality of anode taps in said winding, the anode taps being a multiple of the alternating current circuit taps, the second winding being star connected and having its terminals connected to the first winding and the star point connected to a direct current circuit, a field member associated with said armature, a direct current winding on said field, said armature and field being relatively rotative.

11. A harmonic eliminator and phase transformer for an electrical conversion system comprising an armature, a plurality of windings thereon, one of said windings being closed, a plurality of taps in said closed winding adapted for connection to an alternating current circuit, a plurality of anode taps in said winding, the second winding being star connected and having its terminals connected to the first winding and the star point connected to a direct current circuit, a field member associated with said armature, a direct current winding on said field, said armature and field being relatively rotative, and a squirrel cage winding on said field member.

12. A rotary phase splitter and filter for a vapor electric converter comprising, an armature winding, three taps in said winding for connection to a three-phase alternating current circuit, six taps in said winding for connection to the valves of a converter, a star connected winding having a mid-tap connected to a direct current circuit, the side of said direct current circuit being closely coupled with the armature winding, a field system associated with said armature, said field system having main poles and auxiliary poles angularly disposed relative to the main poles, an auxiliary winding carried by the field system, said auxiliary winding being coupled with the armature winding, said armature and field system rotating relative to each other at synchronous speed.

13. A dynamo-electric device for connecting a plurality of circuits to a vapor electric converter comprising an armature, two windings thereon, one of said windings being connected in shunt with the valves of the converter and the other of said windings being connected in series with the valves of the converter, and an auxiliary rotating winding associated with said armature windings.

14. In a conversion system utilizing a plurality of electric valves for transferring energy between electric circuits, a dynamo-electric coupling device comprising a closed armature winding connected in shunt with the electric valves, a star connected armature winding connected in series with said valves, a field structure rotatably associated with said armature windings, and an amortisseur winding carried by the field structure.

JOSEPH SLEPIAN.
LEON R. LUDWIG.
DANIEL SILVERMAN.